United States Patent
Wong

(10) Patent No.: US 11,012,517 B2
(45) Date of Patent: May 18, 2021

(54) SYSTEM AND METHOD FOR ACCESSING MULTIMEDIA CONTENT

(71) Applicant: Alexander Wong, Markham (CA)

(72) Inventor: Alexander Wong, Markham (CA)

(73) Assignee: BCE INC., Verdun (CA)

( * ) Notice: Subject to any disclaimer, the term of this patent is extended or adjusted under 35 U.S.C. 154(b) by 300 days.

(21) Appl. No.: 15/850,481

(22) Filed: Dec. 21, 2017

(65) Prior Publication Data

US 2018/0191834 A1   Jul. 5, 2018

Related U.S. Application Data

(60) Provisional application No. 62/440,069, filed on Dec. 29, 2016.

(51) Int. Cl.
| | |
|---|---|
| *H04L 29/08* | (2006.01) |
| *G06F 16/9535* | (2019.01) |
| *G06F 16/435* | (2019.01) |
| *H04L 29/12* | (2006.01) |
| *H04N 21/4788* | (2011.01) |
| *H04N 7/15* | (2006.01) |
| *H04N 21/472* | (2011.01) |

(52) U.S. Cl.
CPC .......... *H04L 67/141* (2013.01); *G06F 16/435* (2019.01); *G06F 16/9535* (2019.01); *H04L 61/106* (2013.01); *H04L 61/1529* (2013.01); *H04L 67/146* (2013.01); *H04N 7/152* (2013.01); *H04N 21/4788* (2013.01); *H04N 21/47202* (2013.01); *H04L 61/1594* (2013.01); *H04L 61/307* (2013.01); *H04L 61/308* (2013.01); *H04L 61/3085* (2013.01)

(58) Field of Classification Search
CPC . H04L 67/141; H04L 67/146; H04L 61/1594; G06F 16/435; G05F 16/9535
USPC ......................................................... 709/227
See application file for complete search history.

(56) References Cited

U.S. PATENT DOCUMENTS

| | | | | |
|---|---|---|---|---|
| 9,191,359 | B2 * | 11/2015 | Vendrow | H04L 67/24 |
| 9,369,586 | B2 * | 6/2016 | Sterman | H04L 61/6009 |
| 9,424,556 | B2 * | 8/2016 | Ollila | G06Q 10/10 |
| 9,824,163 | B2 * | 11/2017 | Mostafa | G06F 16/907 |

(Continued)

*Primary Examiner* — Backhean Tiv
(74) *Attorney, Agent, or Firm* — Gowling WLG (Canada) LLP

(57) ABSTRACT

Devices, systems, and methods are described herein that comprise a multi-screen application which allows users to establish communication sessions with other users of the multi-screen application as well as allowing the user to request multimedia content using the same multi-screen application interface. The user makes a connection request to establish a multimedia session by entering a name or phone number. The multi-screen application uses a request string from the connection request to search a user's contact directory in order to determine possible user connection identifiers associated with the request string. The multi-screen application may additionally or alternatively transmit the request string to a directory server maintained by a service provider. The directory server may provide an endpoint for retrieving multimedia content associated with the string. The multi-media application may be used to allow a user to 'call' multimedia content using the same user interface used for calling another user.

16 Claims, 5 Drawing Sheets

(56) References Cited

U.S. PATENT DOCUMENTS

| | | | |
|---|---|---|---|
| 2004/0073538 A1* | 4/2004 | Leishman | G06Q 30/02 |
| 2005/0157858 A1* | 7/2005 | Rajagopalan | G06Q 10/10 379/93.23 |
| 2006/0067304 A1* | 3/2006 | McDowall | H04L 67/26 370/352 |
| 2007/0038720 A1* | 2/2007 | Reding | H04L 51/28 709/217 |
| 2007/0161409 A1* | 7/2007 | Ohtsuki | H04L 12/66 455/564 |
| 2007/0192289 A1* | 8/2007 | Lin | G06F 16/9537 |
| 2007/0233806 A1* | 10/2007 | Asadi | G06F 16/951 709/217 |
| 2008/0172365 A1* | 7/2008 | Ozden | H04L 51/38 |
| 2009/0150488 A1* | 6/2009 | Martin-Cocher | H04L 61/1594 709/204 |
| 2010/0070488 A1* | 3/2010 | Sylvain | G06F 16/9535 707/722 |
| 2010/0077027 A1* | 3/2010 | Chitturi | H04L 67/125 709/203 |
| 2010/0083125 A1* | 4/2010 | Zafar | H04M 3/4931 715/739 |
| 2010/0153528 A1* | 6/2010 | Pearson | G06F 16/27 709/223 |
| 2010/0211634 A1* | 8/2010 | Song | H04L 51/28 709/203 |
| 2011/0208772 A1* | 8/2011 | Mostafa | G06F 16/907 707/769 |
| 2012/0096523 A1* | 4/2012 | Ollila | G06Q 10/10 726/5 |
| 2013/0091287 A1* | 4/2013 | Chitturi | H04L 61/1594 709/227 |
| 2014/0074529 A1* | 3/2014 | Jay | G06Q 30/016 705/7.15 |
| 2014/0122522 A1* | 5/2014 | Ganapathy | G06Q 10/101 707/769 |
| 2014/0163994 A1* | 6/2014 | Lau | H04M 1/271 704/275 |
| 2014/0295806 A1* | 10/2014 | Frager | H04L 61/305 455/414.1 |
| 2015/0382068 A1* | 12/2015 | Shimy | H04N 21/84 725/40 |
| 2017/0169118 A1* | 6/2017 | Jhaj | G06F 16/9535 |
| 2018/0191834 A1* | 7/2018 | Wong | H04L 67/146 |

* cited by examiner

SYSTEM AND METHOD FOR ACCESSING MULTIMEDIA CONTENT

RELATED APPLICATIONS

This application claims priority to U.S. Provisional Patent Application No. 62/440,069, filed Dec. 29, 2016, the entire contents of which are incorporated herein by reference.

TECHNICAL FIELD

The present disclosure relates to accessing multimedia content, and in particular to accessing multimedia content using device applications.

BACKGROUND

Communication applications can be executed by communication devices such as mobile phones to allow users to communicate with each other. Communication applications that can provide the same communication functionality across different devices such as mobile phones, tablets, laptops, smart TV's, set-top boxes, smart watches, or other communication devices may be referred to as multi-screen communication applications, or simply multi-screen applications. Multi-screen applications may allow communication using audio, video, text and/or multimedia messages or streams. The multi-screen applications may be provided by a network operator or as an over-the-top (OTT) application. Examples of multi-screen applications may include Orange TuGo, Apple Facetime™, and WhetsApp™.

Multi-screen applications allow users to establish communication sessions with other individuals or their associated devices with the multi-screen application using particular user identifiers. For example, the identifiers for establishing communication sessions with a user could include a phone number 416-555-1111, a SIP identifier such as 4165551111@sip.example.com or an e-mail address such as jane.doe@example.com. Depending upon the type of communication, the session may be established over a traditional Public Switched Telephone Network (PSTN) end point, or over the Internet.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
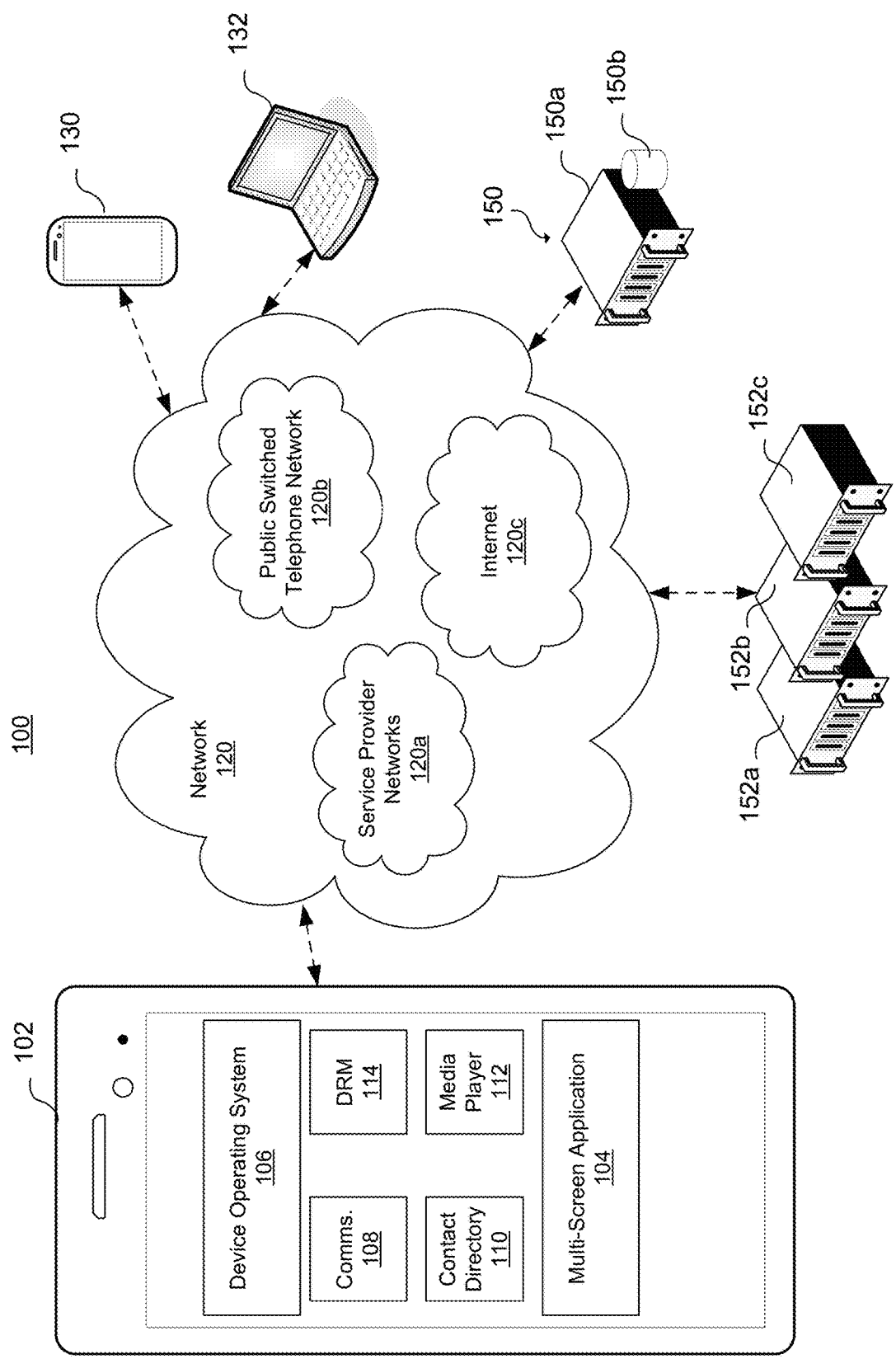
FIG. 1 depicts a system for enabling multi-screen applications to access multimedia content.

In accordance with the present disclosure there is provided a system for accessing multimedia content, comprising: a communication device comprising: a processor for executing instructions; and a memory for storing instructions, which when executed by the processor configure the communication device to provide multi-screen application functionality to: receive a connection request including a request string; transmit the request string to a keyword directory server; search a user's contact directory with the request string for a contact connection identifier associated with a contact; receive in response to the transmitted request string a remotely determined connection identifier; select one of the remotely determined connection identifier and the contact connection identifier determined from searching the user's contact directory; and establish a multimedia connection with the selected one of the remotely determined connection identifier or the contact connection identifier determined from searching the user's contact directory; and the keyword directory server in communication with the communication device over a communication network and configured to: receive the transmitted request string; search one or more keyword directory databases for multimedia content information including comprising a uniform resource identifier (URI) associated with the request string; and transmit to the communication device the URI for the multimedia content associated with the request string for receipt by the communication device as the remotely determined connection identifier.

In a further embodiment of the system, the multi-screen application has functionality to automatically establish a connection with one of the remotely determined connection identifier and the contact connection identifier that is associated with the request string when only one of the remotely determined connection identifier and the contact connection identifier is associated with the request string.

In a further embodiment of the system, the multi-screen application has functionality to search only the user's contact directory for the contact identifier if a remotely determined connection identifier is not received.

In a further embodiment of the system, the multi-screen application has functionality to only transmit the request string to the keyword directory server if there is no contact connection identifier found from the user's contact directory.

In a further embodiment of the system, the multi-screen application has further functionality to generate a contact stored in the user's contact directory associated with the remotely determined connection identifier.

In a further embodiment of the system, selecting the remotely determined connection identifier or the contact connection identifier comprises receiving user input indicating a selection of the remotely determined connection identifier or the contact connection identifier.

In a further embodiment of the system, wherein the keyword directory server is further configured to transmit to the communication device that the request string is invalid if there is no multimedia content associated with the request string.

In accordance with the present disclosure there is further provided a method of accessing multimedia content by a multi-screen application of a communication device, comprising: receiving a connection request including a request string; transmitting the request string to a keyword directory server; searching a user's contact directory with the request string for a user connection identifier associated with a user; receiving in response to the transmitted request string a remotely determined connection identifier comprising a uniform resource identifier (URI) associated with the request string; selecting one of the remotely determined connection identifier and the user connection identifier determined from searching the user's contact directory; and establishing a multimedia connection with the selected one of the remotely determined connection identifier and the user connection identifier determined from searching the user's contact directory.

In a further embodiment of the method, if there is no connection identifier associated with the request string in the user's contact directory, the multimedia connection is automatically established with the remotely determined connection identifier.

In a further embodiment of the method, selecting the remotely determined connection identifier or a connection identifier determined from searching the user's contact directory comprises receiving user input indicating a selection of the remotely determined connection identifier or a connection identifier determined from searching the user's contact directory.

In a further embodiment, the method further comprises receiving the transmitted request string at the keyword directory server; and searching one or more keyword directory databases for multimedia content information associated with the request string.

In a further embodiment of the method, if multimedia content is associated with the request string a connection identifier comprising a URI for the multimedia content associated with the request string is determined and transmitted from the keyword directory server.

The method of claim 12, wherein if there is no multimedia content associated with the request string the keyword directory server transmits that the request string is invalid.

In accordance with the present disclosure there is further provided a communication device comprising: a processor for executing instructions; and a memory for storing instructions, which when executed by the processor configure the communication device to provide multi-screen application functionality to: receive a connection request including a request string; transmit the request string to a keyword directory server; search a user's contact directory with the request string for a user connection identifier associated with a user; receive in response to the transmitted request string a remotely determined connection identifier comprising a uniform resource identifier (URI) associated with the request string; select the remotely determined connection identifier or the user connection identifier determined from searching the user's contact directory; and establish a multimedia connection with the selected of the remotely determined connection identifier or the user connection identifier determined from searching the user's contact directory.

In a further embodiment of the communication device, if there is no connection identifier associated with the request string in the user's contact directory, the processor is configured to automatically establish a multimedia connection with the remotely determined connection identifier.

In a further embodiment of the communication device, selecting the remotely determined connection identifier or a connection identifier determined from searching the user's contact directory comprises receiving user input indicating a selection of the remotely determined connection identifier or a connection identifier determined from searching the user's contact directory.

Embodiments are described below, by way of example only, with reference to FIGS. 1-5.

A multi-screen application is described that allows a user to establish communication sessions with other users of the multi-screen application as well as allowing the user to request multimedia content using the same multi-screen application interface. The multi-screen application can provide a consistent interface regardless of the type of content, including communication sessions with other users as well as consuming multimedia content. The multi-screen application uses request strings to establish multimedia sessions, which may be communication sessions with other users or may be multimedia content retrieved from different providers. The multi-screen application uses the request string to search a user's contact directory in order to determine possible user connection identifiers associated with the request string. The multi-screen application may additionally or alternatively transmit the request string to a directory server maintained by a service provider. The directory server may provide an endpoint for retrieving multimedia content associated with the string. The multi-media application may be used to allow a user to 'call' multimedia content using the same user interface used for calling another user. For example, a user request connecting to "Jane", which could return a phone number, or other similar identifier, from the user's contact directory and the user can then establish communication with "Jane" at the particular number. Further, the user could request "Hockey Game" which would not, it is assumed, return a user identifier from the user's contact directory. Searching the remote directory server for "Hockey Game" may result in returning a server address that provides a multimedia stream of a hockey game. The multi-screen application may display the multimedia content from the returned server address.

FIG. 1 depicts a system for enabling multi-screen applications to access multimedia content. The system 100 comprises a user device 102 that comprises a multi-screen application 104 that allows communication sessions to be established with other users of multi-screen applications as well as to access multimedia content using request strings such as key words or brand names. The system 100 allows for users of a device 102 to access the multi-screen application 104 capable of making voice and video calls, sending and receiving multimedia messages with users of other devices 130, 132, and as well as displaying multimedia content. The system 100 allows for users of device 102 to access the multi-screen application 104 and retrieve live or on-demand multimedia content from a media server 152 using the same, or at least similar, user interface used for user communication sessions. Although device 102 is depicted in FIG. 1 as a mobile phone, and other devices 130, 132, are depicted in FIG. 1 as a mobile phone and laptop, respectively, it is noted that these devices may be any device capable of running the multi-screen application including but not limited to: mobile phones, tablets, laptops, smart TV's, set-top boxes, smart watches, or any smart device with an Internet browser.

The multi-screen application 104 on device 102 is operably coupled with the device operating system 106. The device operating system 106 is coupled with hardware such as a processor, a memory, non-volatile storage, etc. The memory comprises instructions that when executed by the processor allow the processor to carry out specific functions of the device 102 and the multi-screen application 104 functionality described herein. For example, when the multi-screen application 104 is downloaded onto the device 102, relevant instructions required for the application to run on the device may be stored in the memory which are then executed by the processor when the application is in use. The multi-screen application may also be updated to add, modify, or delete aspects of the instructions stored in the memory. The multi-screen application 104 is also operably coupled with various software components of the device 102, including but not limited to a network interface 108, a user's contact directory 110, a media player 112, and a Digital Rights Management (DRM) capability 114. The user's contact directory 110 does not necessarily have to be stored on the device 102 itself, and may be remote such as in cloud storage.

The multi-screen application 104 may have various features, including but not limited to a user interface for display on a device's display and for receiving user input from a touch screen, keyboard, number pad, etc. When a user of device 102 wants to make voice and/or video calls or send/receive multimedia messages to users of other devices 130, 132, the user sends this connection request through the multi-screen application 104 which is received by the processor through the device operating system 106. The user may enter a request string that is indicative of the communication request, such as a phone number or other user identifier. The user's contact directory 110 is operably coupled with the multi-screen application 104, and so a user may make their connection request of who to contact by selecting a name, phone number, e-mail address, etc., from the user's contact directory 110. Alternatively, a phone number or e-mail address may simply be entered within the multi-screen application 104 using the touch screen keyboard or number pad, for example.

The device 102 may be connected to the other devices 130, 132 by the network interface 108 which connects to the network 120 of the service provider for device 102. The network 120 may comprise service provider networks 120*a*, a public switched telephone network (PTSN) 120*b*, and the Internet 120*c*, for example. The data/information from the call or multimedia message may be sent to the other devices 130, 132 over the PTSN 120*b* or via the Internet 120*c*. The reverse occurs for receiving calls or multimedia messages at device 102 from other devices 130, 132. While the service provider networks 120*a*, PSTN 120*b*, and Internet 120*c* are shown in FIG. 1 as separate networks within the network 120 it may be readily envisioned that these contain overlap and may not be distinct.

When a user of device 102 wants to connect with and retrieve live or on-demand multimedia content, they may do so by making a connection request using a request string through the multi-screen application 104. This is received by the processor through the device operating system 106, and the multimedia content may be accessed over the network 120, for example through the network interface 108. The connection request may be for various types of multimedia content, including but not limited to live or on-demand video, audio, and interactive content. Numerous other types of multimedia content may be readily envisioned that could be retrieved using the methods and systems described herein. The connection request may be initiated by the user using the same call/text entry method as described with respect to making voice and video calls or sending multimedia messages, except that instead of phone numbers or e-mail addresses of users the request string uses keywords and/or brand names.

For example, within the multi-screen application 104, the user may enter 'CTV' to watch CTV live, or 'TSN' to watch TSN live. Similarly, the user may enter 'Big Bang' to watch the last episode of The Big Bang Theory. For audio, the user may call or enter 'CHUMFM' to listen to the radio station CHUM FM. For on-demand content, the user may enter, for example, 'Gladiator' to watch the movie Gladiator, or enter 'White Christmas' to listen to the song White Christmas. Therefore the multi-screen application 104 provides the user of device 102 with quick access to a multimedia content, whether live or on-demand, using a familiar user interface typically used for calling or communicating with other users.

Requests may also be made for video and audio marketing. For example, the user may enter STARWARS' to watch the latest Star Wars trailer or special promotion. The user may enter 'SNOW' to see how you can use a specific new snow shovel from Canadian Tire. The user may also retrieve program info, for example by texting 'new Big Bang' to 'CTV' to get the date and time of the next new episode of The Big Bang Theory. There could also be interactive content such as game-like interactions with a video or audio content. Numerous other implementations may be envisioned without departing from the scope of this disclosure.

When a user enters a request string including a keyword or brand name they are making a connection request for the multi-screen application 104 on device 102 to be connected with the multimedia content associated with that request. A request string corresponding to the connection request is received at the processor of device 102, and is then transmitted via network 120 to a keyword directory server 150. The keyword directory server 150 may include a keyword directory server front end 150*a* and a keyword directory database 150*b*. The keyword directory server 150 may comprise a processor and a memory or other non-transitory storage medium (not shown) containing instructions to be executed by the processor. The keyword directory server 150 associates request strings with multimedia content and can provide to the multi-screen application 104 a connection identifier containing for example a uniform resource identifier (URI) associated with the request string. This allows the multi-screen application 104 to request and retrieve the multimedia content from the appropriate storage location. Upon receiving the request string from device 102, the keyword directory server front end 150*a* may search the keyword directory server database 150*b* to determine if the request string matches or is associated with multimedia content. If the request string is associated with multimedia content, the keyword directory server front-end 150*a* uses the keyword directory database 150*b* to determine a connection identifier comprising a URI of the multimedia content.

Multimedia content may be located at one or more multimedia content servers 152*a-c* (collectively, 152). Multimedia content information such as the date and time that an episode of a TV show will air may also be stored. The multimedia content servers 152 may similarly comprise a front-end and a database (not shown), with hardware components such as a processor, memory, etc. (not shown). When the keyword directory server 150 returns the URI of the requested multimedia content this directs the multi-screen application 104 to establish a multimedia connection with the appropriate multimedia content server 152*a*, 152*b*, 152*c*, allowing for the retrieval of the requested multimedia content. For example, TSN multimedia content may be stored on media server 152*a*, CTV multimedia content may be stored on media server 152*b*, CHUM FM content may be stored on media server 152*c*, etc. If the keyword directory server front end 150*a* searches the keyword directory server database 150*b* but determines that there is no multimedia content associated with the request string, the keyword directory 150 may respond to the multi-screen application 104 that the request string is invalid.

The keyword directory server front end 150*a* and keyword directory server database 150*b* may be managed by a service provider to keep it up-to-date, add/delete content, etc. The association of request strings to multimedia content may be controlled by the service provider so that new request strings and associations can be added and old ones can be modified or deleted without any change on the multi-screen application 104. The service provider may associate each request string with the appropriate multimedia content within the multimedia content server 152. The multimedia content does not have to be provided by the same service provider that manages the keyword directory server 150.

An example of the functionality of the system 100 is as follows. When the keyword directory server 150 receives a request string such as 'CTV' from device 102 corresponding to a connection request to watch live CTV content, the keyword directory sever front end 150*a* checks if there is multimedia content associated with the 'CTV' request string by looking to the keyword directory server database 150*b*. If there is multimedia content associated with the request string, the keyword directory server 150 provides a connection identifier to the multi-screen application 104 which may comprise a URI of the live CTV content stored on the appropriate multimedia content server 152, thus allowing for the multi-screen application 104 to request and retrieve the live CTV content. In the case of video content for example, the retrieved content may be played on the media player 112 of device 102. The media player 112 has intrinsic DRM capability 114 to provide copyright protection for digital media.

In addition to requesting multimedia content from a multimedia content server 152 using a URI, it is possible for the multi-screen application 104 to request multimedia content information. In the scenario described above where a connection request comprises a text message sent to a request string associated with a keyword (ex. texting 'new Big Bang' to 'CTV'), the same procedure as above takes place except that instead of returning live CTV content if CTV is a valid request string, the keyword directory server 150 recognizes the request for multimedia content information regarding the new episode of the Big Bang Theory and if available, provides a corresponding connection identifier allowing the multi-screen application to request this information from the appropriate multimedia content server 152. In the above example, sending "new Big Bang" to "CTV" may result in the multimedia content server 152 returning a next air time of a new episode of The Big Bang Theory.

When the connection request is received by the processor it may also search a user's contact directory 110 for a contact connection identifier that is associated with the request string. This may be performed before, after, or simultaneously when transmitting the request string to the keyword directory server 150. Alternatively, the multi-screen application 104 may determine if only one of the keyword directory server 150 or the user's contact directory 110 should be checked. The determination may be made for example by prompting the user for a selection of which location to check.

If the user's contact directory 110 does not contain a locally-determined contact connection identifier (for example a phone number, e-mail, etc.) associated with the request string the processor may complete the connection request by establishing a multimedia connection with the remotely determined connection identifier provided by the keyword directory server 150. This results in retrieving the requested multimedia content by connecting to the appropriate media server 152 as indicated by the connection identifier.

If there is a local connection identifier in the user's contact directory 110 associated with the request string, the multi-screen application 104 may determine whether to connect to the contact identifier associated with a user of another device or to the remotely determined connection identifier pertaining to a multimedia content server. The determination may be accomplished by, for example, prompting the user if they wish to establish a connection with the contact identifier from the user's contact directory 110 or with the remotely determined connection identifier provided by the keyword directory server 150. Once the processor receives the input by the user, the multimedia connection is established with the selected connection identifier.

For example, if the user makes a connection request by calling 'CTV' and wherein the request string from this connection request is associated with a connection identifier as determined by the keyword directory server 150 such that live CTV content can be streamed from media server 152*b*, a search may be performed in the user's contact directory 110 to determine if there is also a local contact connection identifier associated with the request string of the connection request. If there is no local connection identifier in the user's contact directory 110 (e.g. there is no phone number, e-mail, etc. stored that is associated with a contact) then the live CTV content will be automatically connected to and played using the media player 112. However, if there is a local connection identifier in the user's contact directory 110 (e.g. a corporate phone number for CTV), then the multi-screen application 104 may require input from the user to determine whether to establish a connection with the remotely determined connection identifier (as provided by the keyword directory server 150) or the locally-determined connection identifier (as determined from the contact connection identifier found from the user's contact directory 110).

Users can also store the brand names and key words associated with specific multimedia content, or the associated URIs, in their contact directory 110, similar to phone numbers and e-mail address. As with calling/texting a phone number associated with a contact name, when a user of device 102 wishes to access multi-media content they can open the multi-screen application 104 and select the content name from their contact directory 110 to make the connection request. The keyword stored in the user's contact directory 110 may have the connection identifier and URI to the multimedia content stored with it, so upon 'calling' that 'contact' the device 102 automatically retrieves the multi-media content at the associated URI on the appropriate multimedia content server 152. This may bypass the step of the keyword directory server 150 having to determine if the request string is valid and providing the associated connection identifier to the multi-screen application 104. The service provider may also provide push updates to the personal user contact directories of devices, for example updating the connection identifier when a newer episode of a TV show is aired and stored in the respective media server.

Figure 2:
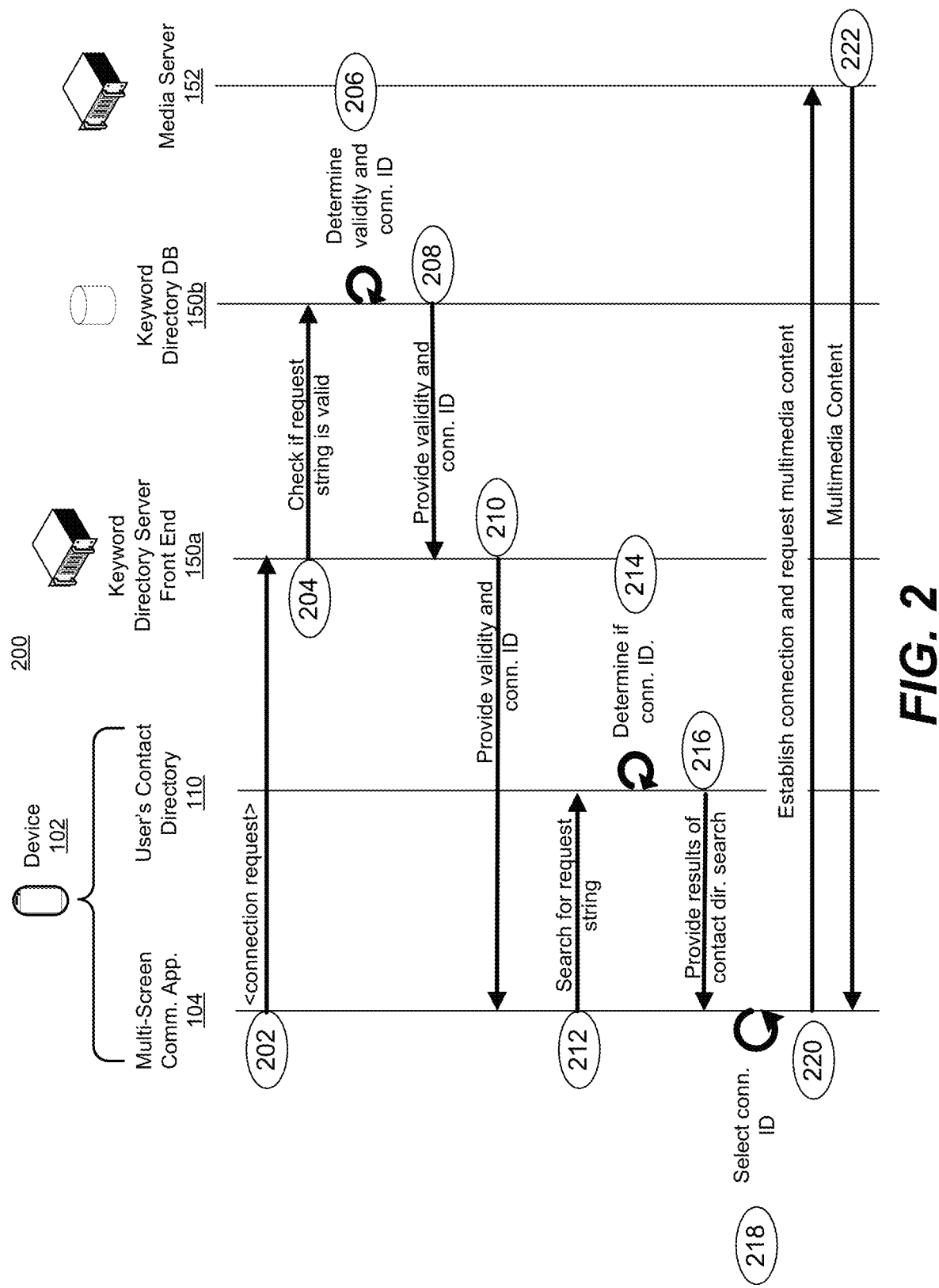
FIG. 2 depicts a communication flow diagram for establishing a multimedia connection with a multimedia server using a multi-screen application.

FIG. 2 depicts a communication flow diagram 200 for accessing multi-media content from a multimedia content server 152 using a multi-screen application 104. The user of device 102 makes a connection request including a request string using the multi-screen application 104 and the request string is transmitted to the keyword directory server 150 (202). The keyword directory server front end 150*a* determines if the request string is valid by searching a keyword directory server database 150*b* for multimedia content associated with the request string (204). As previously described with reference to FIG. 1, if there is multimedia content associated with the request string, i.e. if the request string is valid, a connection identifier comprising a URI is determined at the keyword directory server database 150*b* (206)

to provide a connection identifier at a multimedia content server 152 for the device 102 to establish a connection with. An indication of whether the request string is valid and if so, a connection identifier is provided to the keyword directory server front end 150*a* (208), which then provides this information to the multi-screen application 104 (210).

As previously described with reference to FIG. 1, after a connection request is received by the processor of device 102 through the multi-screen application 104, the request string may also searched for within the user's contact directory 110 (212). This could be performed before, after, or simultaneously with transmitting the request string to the keyword directory server 150. It is determined at the user's contact directory 110 if there is a contact connection identifier associated with the request string (214), and the results of the search are provided back to the multi-screen application 104 (216). If there is both a remotely-determined connection identifier provided by the keyword directory server 150 and a locally-determined connection identifier found by searching the user's contact directory 110, the multi-screen application 104 may prompt the user to make a selection at the multi-screen application 104 of which connection identifier they would like to establish a multimedia connection with (218). For example, the user may choose to establish a multimedia connection with a multimedia content server 152 and request multimedia content at the URI provided in the connection identifier received from the keyword directory server 150 (220). Once the multimedia connection is established the multi-screen application 104 may retrieve the requested multimedia content (222).

Figure 3:
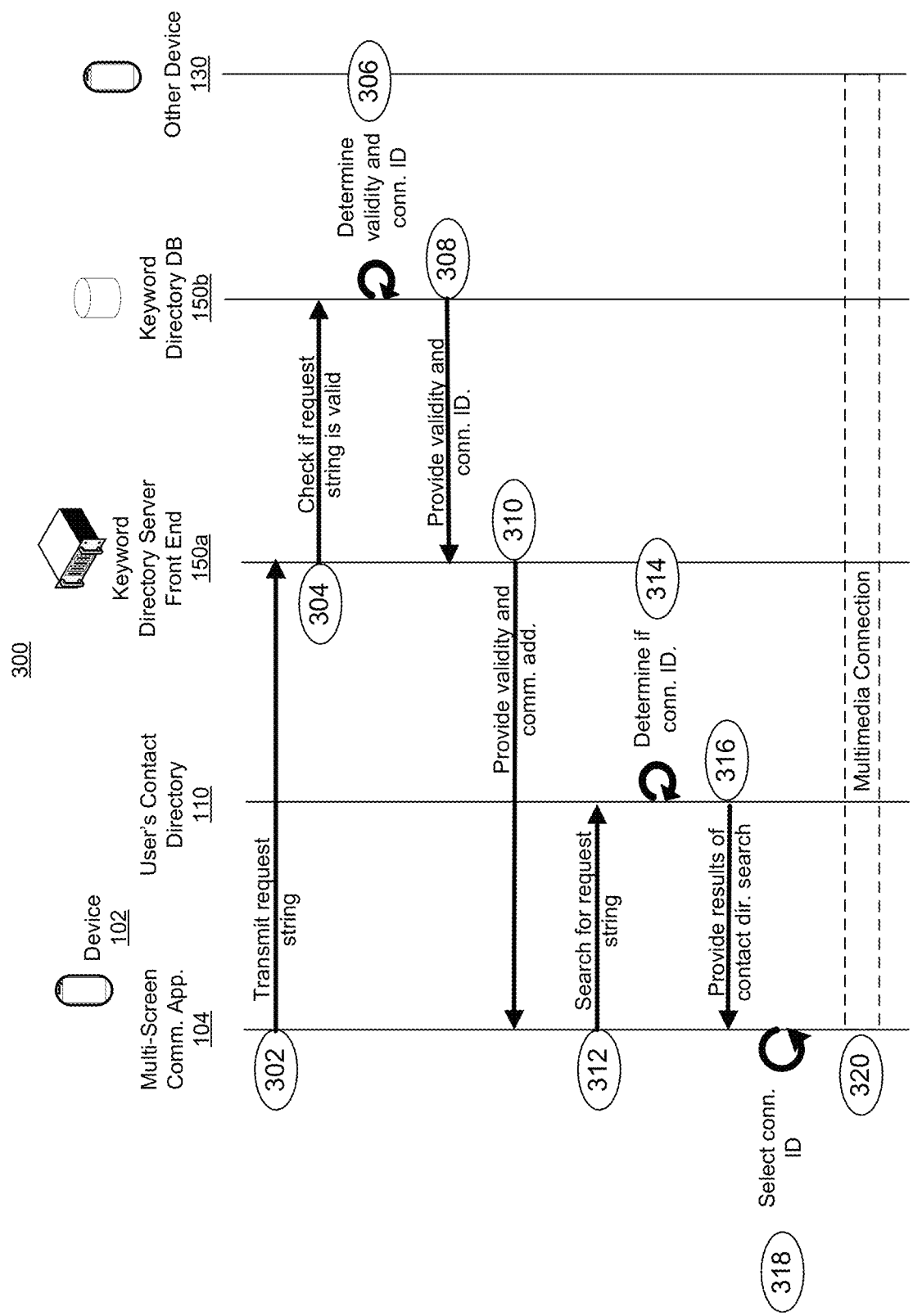
FIG. 3 depicts a communication flow diagram for establishing a multimedia connection with another device using a multi-screen application.

FIG. 3 depicts a communication flow diagram 300 for sharing multimedia content with another device 130 using a multi-screen application 104. The communication flow diagram 300 is similar to the communication flow diagram 200 shown in FIG. 2, with the difference being the selection by the user of which connection identifier to establish a multimedia connection with (318). In this diagram, the user chooses to establish a multimedia connection with a user of other device 130 using the contact connection identifier found by searching the user's contact directory 110 (320). Multimedia content/data may be sent and received between multi-screen application 104 and a multi-screen application on device 130.

Figure 4:
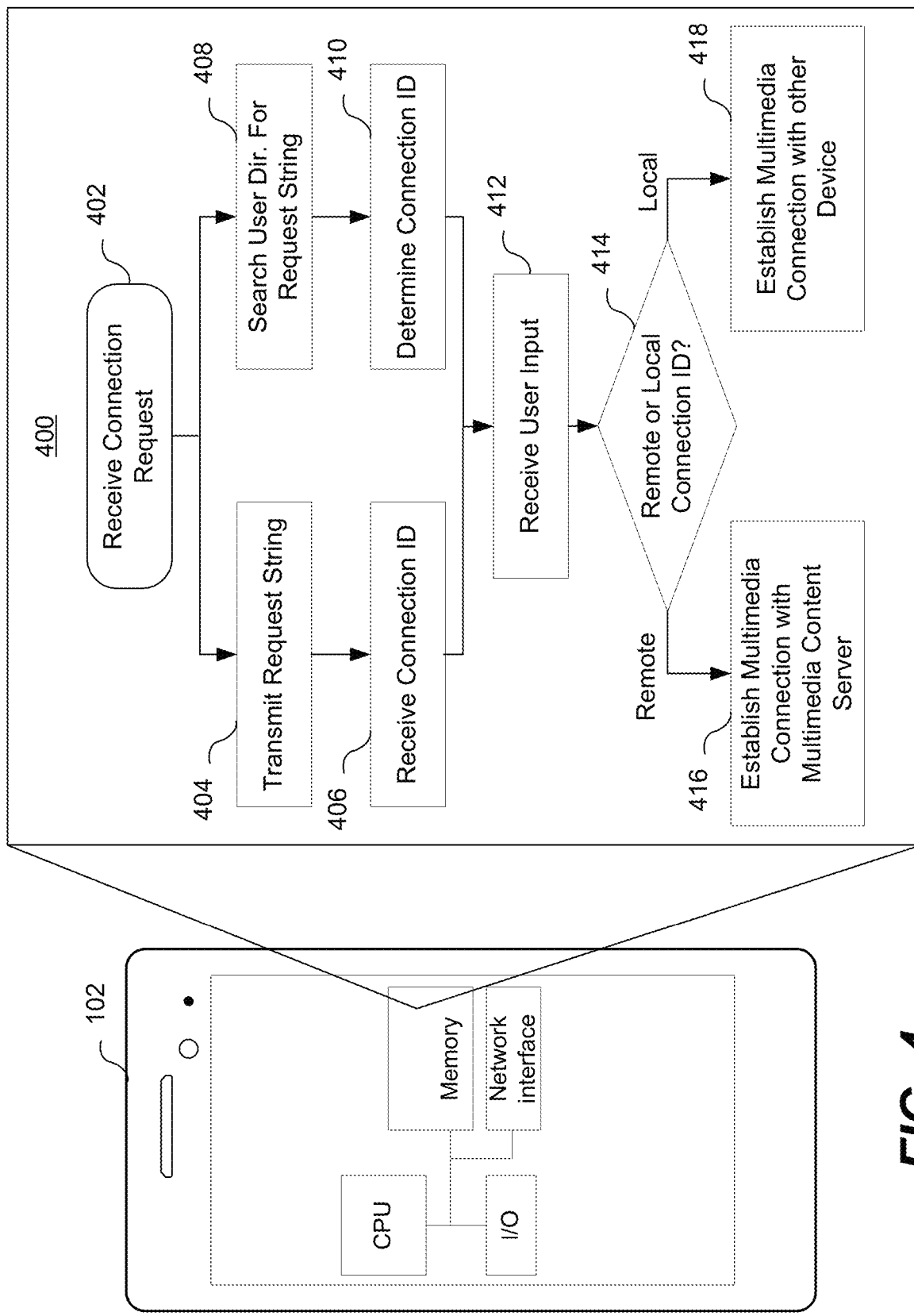
FIG. 4 depicts a method of establishing a multimedia connection by a multi-screen application of a communication device.

FIG. 4 depicts a method 400 of establishing a multimedia connection by a multi-screen application 104 of a communication device 102. The method 400 comprises receiving a connection request (402) containing a request string. The multi-screen application 104 transmits the request string (404) to request multimedia content. For example, the request string is transmitted to the keyword directory server 150. In response, the multi-screen application 104 may receive a connection identifier (406) providing a URI for where the requested multimedia content may be retrieved from.

Before, after, or simultaneously with transmitting the request string, the multi-screen application may also search the user's contact directory 110 for a user/contact associated with the request string (408). If a user/contact exists that is associated with the request string, a contact connection identifier may be determined (410). When both a remotely-determined connection identifier has been received at step 406 and a local connection identifier has been determined at step 410, the multi-screen application may request user input (412) indicating which connection identifier should be used to establish a multimedia connection. Based on the user input received, the multi-screen application 104 determines whether a multimedia connection should be established with the remotely-determined or locally-determined connection identifier (414). If an indication to connect to the remotely-determined connection identifier was selected by the user (REMOTE at 414), a multimedia connection is established to retrieve multimedia content, for example from multimedia content server 152. If an indication to connect to the locally-determined contact connection identifier was selected by the user (LOCAL at 414), a multimedia connection is established with the user of the device to which the connection identifier corresponds to, for example other device 130. This allows the users of device 102 and other device 130 to communicate, for example via text messaging, voice calling, multimedia, etc.

The method 400 is simplified. In particular, it assumes that the request string transmitted to the keyword directory server 150 at step 404 is a valid request that is associated with multimedia content. It also assumes that upon searching the user directory at step 408, there is a contact associated with the request string and hence a contact connection identifier can be determined at step 410. Because there are two possible connection identifiers associated with the request string (remotely-determined and a locally-determined), user input is required at step 412 to indicate which connection identifier should be used to establish a multimedia connection with. There are a number of variations of method 400 and logic that could be performed by the multi-screen application 104 without departing from the scope of this disclosure. As previously described, if the keyword directory server 150 determines that there is no multimedia content associated with the request string it may indicate that the request string is invalid. Upon receiving this, the multi-screen application 104 may automatically establish a multimedia connection with the other device 130 for which a connection identifier was found. The converse is true as well—if there is no locally determined connection identifier at step 410, the multi-screen application 104 may automatically establish a multimedia connection with the multimedia content server 152 using the remotely-determined connection identifier. A user may set preferences or make a selection to perform step 404 or 408 first. For example, the multi-screen application may perform step 404 and if a connection identifier is received at step 406, automatically establish a multimedia connection with the multimedia content server. Alternatively, if the request string is not valid, only then might the multi-screen application 104 perform step 408. The opposite scenario may be performed as well where step 408 is always performed first.

Figure 5:
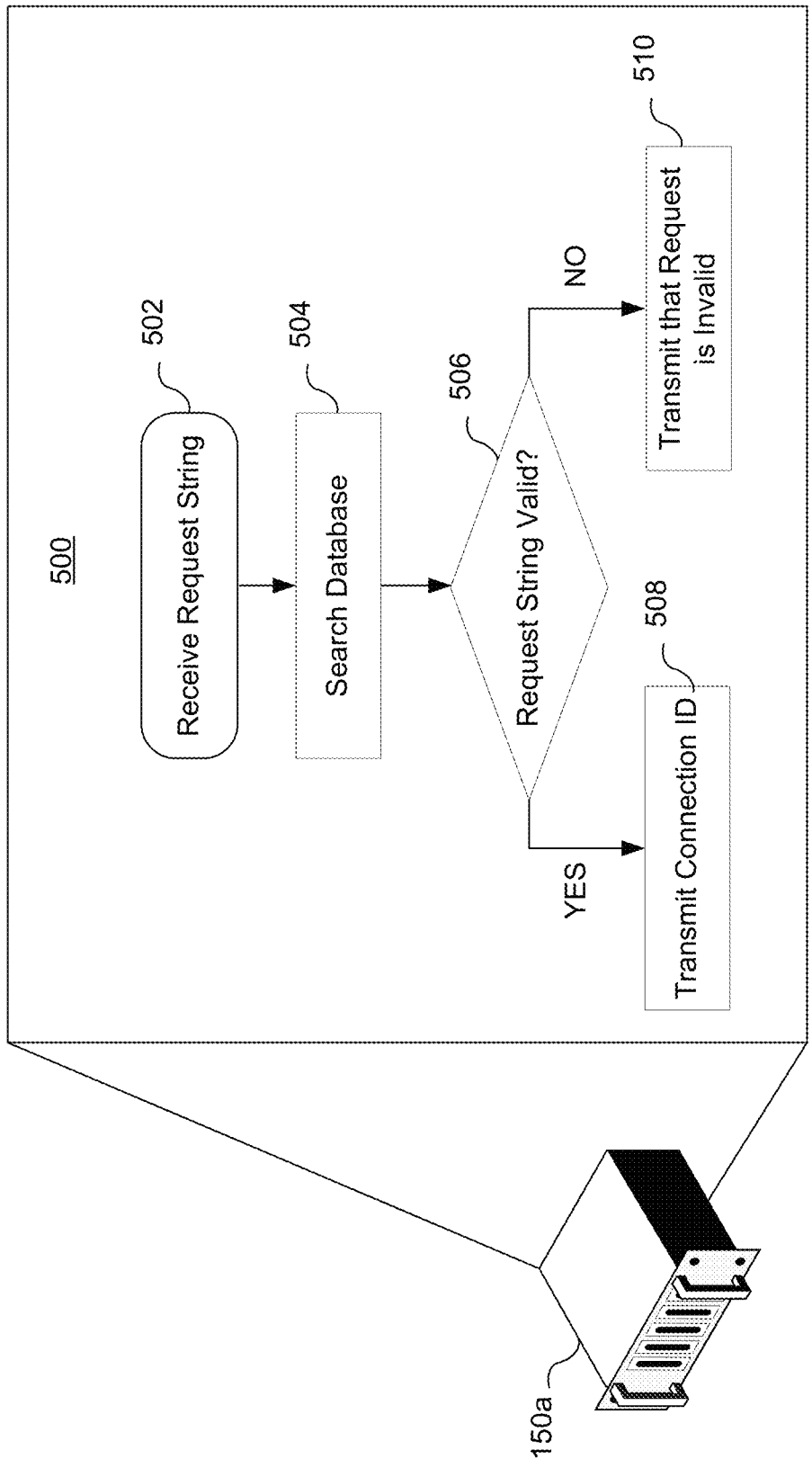
FIG. 5 depicts a method of providing a connection identifier for retrieving multimedia content.

FIG. 5 depicts a method 500 of providing a connection identifier for retrieving multimedia content. The method 500 may be performed by the keyword directory server front end 150*a*, for example. The keyword directory server front end 150*a* receives a request string (502), for example from a multi-screen application, indicating a request to access multimedia content or obtain information regarding multimedia content. The keyword directory server front end 150*a* searches a database (504), such as keyword directory database 150*b*, for the request string. It is determined if the request string is valid (506) based on whether or not the request string is located in the keyword directory database 150*b*, and if so, whether or not there is a connection identifier associated with the request string. If the request string is valid (YES at 506), the keyword directory server front end 150*a* transmits the connection ID to the multi-screen application (508). If the request string is invalid (NO at 506), the keyword directory server front end 150*a* transmits to the multi-screen application that the request is invalid (510).

Each element in the embodiments of the present disclosure may be implemented as hardware, software/program, or any combination thereof. Software codes, either in its entirety or a part thereof, may be stored in a computer readable medium or memory (e.g., as a ROM, for example a non-volatile memory such as flash memory, CD ROM, DVD ROM, Blu-Ray™, a semiconductor ROM, USB, or a magnetic recording medium, for example a hard disk). The program may be in the form of source code, object code, a code intermediate source and object code such as partially compiled form, or in any other form.

It would be appreciated by one of ordinary skill in the art that the system and components shown in FIGS. 1-5 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

The invention claimed is:

1. A system for accessing multimedia content, comprising:
    a communication device comprising:
        a processor for executing instructions; and
        a memory for storing instructions, which when executed by the processor configure the communication device to provide multi-screen application functionality to:
            receive a connection request including a request string;
            transmit the request string to a keyword directory server;
            search a user's contact directory with the request string for a contact connection identifier associated with a contact;
            receive in response to the transmitted request string a remotely determined connection identifier comprising a uniform resource identifier (URI) identifying a location for accessing multimedia content associated with the request string;
            select as a multimedia connection identifier, one of:
                the remotely determined connection identifier received in response to the transmitted request string; and
                the contact connection identifier determined from searching the user's contact directory; and
            establish a multimedia connection with the multimedia connection identifier, wherein establishing the multimedia connection comprises:
                establishing a communication connection with the multimedia connection identifier when the contact connection identifier is selected as the multimedia connection identifier; and
                establishing a connection to the location identified by the multimedia connection identifier to playback the multimedia content when the remotely determined connection identifier is selected as the multimedia connection identifier; and
    the keyword directory server in communication with the communication device over a communication network and configured to:
        receive the transmitted request string;
        search one or more keyword directory databases, storing multimedia content information associating respective URIs with respective strings, for a URI associated with a string that at least partially matches the request string; and
        transmit to the communication device the URI for the multimedia content associated with the string at least partially matching the request string for receipt by the communication device as the remotely determined connection identifier.

2. The system of claim 1, wherein the multi-screen application has functionality to automatically establish a connection with one of the remotely determined connection identifier and the contact connection identifier that is associated with the request string when only one of the remotely determined connection identifier and the contact connection identifier is associated with the request string.

3. The system of claim 1, wherein the multi-screen application has functionality to search only the user's contact directory for the contact connection identifier if a remotely determined connection identifier is not received.

4. The system of claim 1, wherein the multi-screen application has functionality to only transmit the request string to the keyword directory server if there is no contact connection identifier found from the user's contact directory.

5. The system of claim 1, wherein the multi-screen application has further functionality to generate a contact stored in the user's contact directory associated with the remotely determined connection identifier.

6. The system of claim 1, wherein selecting the remotely determined connection identifier or the contact connection identifier comprises receiving user input indicating a selection of the remotely determined connection identifier or the contact connection identifier.

7. The system of claim 1, wherein the keyword directory server is further configured to transmit to the communication device that the request string is invalid if there is no multimedia content associated with the request string.

8. A method of accessing multimedia content by a multi-screen application of a communication device, comprising:
    receiving a connection request including a request string;
    transmitting the request string to a keyword directory server;
    searching a user's contact directory with the request string for a contact connection identifier associated with a user;
    receiving in response to the transmitted request string a remotely determined connection identifier comprising a uniform resource identifier (URI) identifying a location for accessing content associated with the request string;
    selecting as a multimedia connection identifier, one of:
        the remotely determined connection identifier received in response to the transmitted request string; and
        the contact connection identifier determined from searching the user's contact directory; and
    establishing a multimedia connection with the multimedia connection identifier, wherein establishing the multimedia connection comprises:
        establishing a communication connection with the multimedia connection identifier when the contact connection identifier is selected as the multimedia connection identifier; and
        establishing a connection to the location identified by the multimedia connection identifier to playback the multimedia content when the remotely determined connection identifier is selected as the multimedia connection identifier.

9. The method of claim 8, wherein if there is no contact connection identifier associated with the request string in the user's contact directory, the multimedia connection is automatically established with the remotely determined connection identifier.

10. The method of claim 8, wherein selecting the remotely determined connection identifier or the contact connection identifier determined from searching the user's contact directory comprises receiving user input indicating a selection of the remotely determined connection identifier or a connection identifier determined from searching the user's contact directory.

11. The method of claim 8, further comprising:
receiving the transmitted request string at the keyword directory server; and
searching one or more keyword directory databases for multimedia content information associated with the request string.

12. The method of claim 11, wherein if multimedia content is associated with the request string a connection identifier comprising a URI for the multimedia content associated with the request string is determined and transmitted from the keyword directory server.

13. The method of claim 12, wherein if there is no multimedia content associated with the request string the keyword directory server transmits that the request string is invalid.

14. A communication device comprising:
a processor for executing instructions; and
a memory for storing instructions, which when executed by the processor configure the communication device to provide multi-screen application functionality to:
receive a connection request including a request string;
transmit the request string to a keyword directory server;
search a user's contact directory with the request string for a contact connection identifier associated with a contact;
receive in response to the transmitted request string a remotely determined connection identifier comprising a uniform resource identifier (URI) identifying a location for accessing content associated with the request string;
select as a multimedia connection identifier, one of:
the remotely determined connection identifier; and
the contact connection identifier determined from searching the user's contact directory; and
establish a multimedia connection with the multimedia connection identifier, wherein establishing the multimedia connection comprises:
establishing a communication connection with the multimedia connection identifier when the contact connection identifier is selected as the multimedia connection identifier; and
establishing a connection to the location identified by the multimedia connection identifier to playback the multimedia content when the remotely determined connection identifier is selected as the multimedia connection identifier.

15. The communication device of claim 14, wherein if there is no connection identifier associated with the request string in the user's contact directory, the processor is configured to automatically establish a multimedia connection with the remotely determined connection identifier.

16. The communication device of claim 14, wherein selecting the remotely determined connection identifier or the contact connection identifier determined from searching the user's contact directory comprises receiving user input indicating a selection of the remotely determined connection identifier or the contact connection identifier determined from searching the user's contact directory.

* * * * *